US006350816B1

(12) United States Patent
Farronato et al.

(10) Patent No.: US 6,350,816 B1
(45) Date of Patent: *Feb. 26, 2002

(54) PROCESS FOR SYNTHESIS OF RESINS CONTAINING UNSATURATIONS OF THE (METH) ACRYLIC TYPE TO BE CURED BY RADIATION OR HEAT AND USED FOR POWDER PAINTS

(75) Inventors: Silvestro Farronato; Sergio Gazzea, both of Romano d'Ezzelino; Roberto Chinellato, Venezia-Marghera, all of (IT)

(73) Assignee: Solutia Italy S.r.l., Romano d'Ezzelino (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/000,382

(22) PCT Filed: May 24, 1997

(86) PCT No.: PCT/EP97/02774

§ 371 Date: Mar. 11, 1998

§ 102(e) Date: Mar. 11, 1998

(87) PCT Pub. No.: WO97/46594

PCT Pub. Date: Dec. 11, 1997

(30) Foreign Application Priority Data

May 30, 1996 (IL) .......................................... MI96A1097

(51) Int. Cl.$^7$ .......................... C08G 63/52; C08F 232/00
(52) U.S. Cl. ................. 525/326.1; 526/307.2; 526/317.1; 526/318.4; 526/318.44; 526/327; 522/104; 428/420
(58) Field of Search ................................ 526/319, 320, 526/307.2, 317.1, 318.4, 318.44, 327; 522/104; 428/420; 525/326.1

(56) References Cited

U.S. PATENT DOCUMENTS

| 4,133,731 A | * | 1/1979 | Hensen et al. ............... 522/110 |
| 4,600,738 A | * | 7/1986 | Lamm et al. ................ 523/500 |
| 4,820,745 A | * | 4/1989 | Muller et al. .................. 522/90 |

FOREIGN PATENT DOCUMENTS

| JP | 1474147 | * | 5/1977 | |
| JP | 04180918 | * | 6/1992 | ........... C08G/63/52 |

\* cited by examiner

*Primary Examiner*—David W. Wu
*Assistant Examiner*—Tanya Zalukaeva
(74) *Attorney, Agent, or Firm*—Darby & Darby

(57) ABSTRACT

Resins comprising (meth)acrylic unsaturations are obtained by reacting functional groups of unsaturated monomers without solvents at temperatures above 150° C. and under controlled heat exchange, while maintaining intact their unsaturations, with functional groups of saturated and/or unsaturated polymers. The technologies and the work cycles used for conventional resins may also be used for these resin types.

5 Claims, No Drawings

PROCESS FOR SYNTHESIS OF RESINS CONTAINING UNSATURATIONS OF THE (METH) ACRYLIC TYPE TO BE CURED BY RADIATION OR HEAT AND USED FOR POWDER PAINTS

Owing to known strong homopolymerization tendency of acrylic monomers in order to yield polymers comprising acrylic unsaturations, relatively low temperatures are used (in the range of 60 to 130° C.; at most 150° C.) together with suitable amounts of polymerization inhibitors and by adding solvent in order to lower polymer viscosity. In this way, uniform mass heating is favoured and local superheating, which would cause the polymerization of unsaturated functionalities, is avoided.

Several processes, working either in the presence of solvents or at relatively low temperatures together with short reaction times to yield polymers comprising unsaturated groups for powder paints, are known.

EP 0249306 (Autotype Int.Appl.)discloses an unsaturated polymer obtained in toluene solution wherefrom it is precipitated and filtered. EP 0636669 and EP 0644905 (DSM) disclose polymers obtained at temperatures of 50 to 110° C. in butylacetate solution or toluenetxylene solution followed by solvent stripping at 150° C. EP 0650978 (BASF) discloses unsaturated polymers obtained without solvents, but homogenized by extruding reactive compounds together with unsaturated functional monomers at temperatures up to 130° C. for a short time (7–15 min).

These limitations in temperatures and time impair the possibility of using the synthesis. However, many manufactures of resins for powder paint are in the need of carrying on, also for these types of resins, the use of technologies and work cycles used for conventional resins such as polyesters and acrylics, which are manufactured at temperatures above 150° C., up to 260° C., and unloaded at temperatures between 160 and 220° C. for a relatively long time (0.5–8 hours) dependent upon the resin amount and the crushing rate of the flaking machine. However, for the above stated reasons, that has not been possible up to now.

It has now surprisingly been found possible to add an unsaturated functional monomer to a resin comprising reactive functional groups, maintained at temperatures in the range of 150° C. to 200° C. and with an addition of suitable inhibitor amounts, and to react it with the resin for 50 to 60 minutes without affecting the resin unsaturation.

This object is achieved by supplying the reaction mass with heat in order to avoid local superheating. This in practice occurs by maintaining the temperature in the range of values reached during the exothermic reaction or slightly higher without the need of adding solvents.

Starting polymers usable for the purposes of this invention may be either acrylic resins or saturated or unsaturated polyesters having reactive groups such as hydroxy, carboxylic, glycidyl, isocyanate groups, whereas (meth) acrylics comprising functional groups mentioned above are especially used as reactive monomers.

The unsaturated functional monomers are preferably selected from the group consisting of glycidyl(meth) acrylate, (meth)acrylic acid, methacrylisocyanate, benzo-1-(1-isocyanate-1-methyl)-4,1-methenyl, isocyanateethyl-methacrylate or unsaturated isocyanate adducts.

Polymerization inhibitors are conventional inhibitors such as hydroquinone, hydroquinone-monomethylether, mono-ter-butylhydroquinone, phenotiazine, diethylhydroxylamine, diphenyl-p-phenylenediamine, isopropyl-phenyl-p-phenylenediamine, triphenylphosphite.

The process of this invention will now be described, but not limited by the following examples, wherein the term "parts" is to be intended as "parts by weight".

EXAMPLE 1

In a four-neck flask provided with a thermometer, a stirrer, a distillation column and an inert gas bubbling inlet, 1500 parts of Alftalat AN 725 (carboxylic polyester provided by Hoechst and having NA=30–36, cone-plate viscosity of 4000–7000 mPas/200° C., Tg=63–69° C.) were loaded. The resin was melted at 180° C. and thereafter 250 parts of glycidyl methacrylate together with 1 part of hydroquinone were added dropwise and under stirring for 20 minutes. This temperature was maintained through mild heating until NA=3 and cone-plate viscosity of 1120 mPas/200° C. were reached. Thereafter the temperature was brought to 170° C. and the mass was maintained at this temperature for 3 hours without having gelation followed by its unloading and its cooling. The obtained product had NA=1.5 and cone-plate viscosity of 1680 mPas/200° C., Tg=40° C. and equivalent weight unsaturation grade of about 1000.

EXAMPLE 2

Following the same process of Example 1 850 parts of Synthacryl VSC 1438 (glycidyl resin provided by Hoechst and having EEW=360–400, cone-plate viscosity of 8000–12000 mPas/170° C., Tg=46–52° C.), were loaded and after having melted the mass at 180° C., 2.5 parts of triphenylphosphite, 8 parts of hydroquinone and 1 parts of phenotiazine were added. After homogenization of the resultant mass 150 parts of methacrylic acid were added dropwise for 10 min. After 10 minutes from the conclusion of the addition, the final product was examined and it was found to have NA=1 and cone-plate viscosity of 2600 mPas/200° C. The temperature of 180° C. was maintained for another hour and after this time the mass was unloaded. The obtained product was found to have NA=0.5, cone-plate viscosity of 3400 mPas/200° C., softening point of 80–85° C., equivalent weight unsaturation grade of about 575.

EXAMPLE 3

In a 5 liter reactor provided with a thermometer, a stirrer and an inert gas bubbling inlet 620 parts of ethyleneglycol, 150 parts of neopentyleneglycol, 1328 parts of terephthalic acid and 2 parts of monobutylstannoic acid were loaded. Therefore the mass was heated at 240° C. in order to obtain hydroxy saturated polyester having NOH of about 200. The polyester was cooled at 170° C. and 441 parts of maleic anhydride and 0.4 parts of hydroquinone were added, followed by heating at 200° C. until an unsaturated polyester having NA=50, cone-plate viscosity of 1440 mPas/200° C. and softening point of 80–85° C. was obtained. Thereafter the product was cooled at 180° C. and at this temperature 300 parts of glycidilmethacrylate together with 1 part of hydroquinone were added for 10 min. After 15 minutes the product was examined and it was found to have NA=0.8 and cone-plate viscosity of 1000 mPas/200° C. The mass was maintained at 180° C. for further 8 hours and after its cooling the product had NA=0.8, cone-plate viscosity of 1320 mPas/200° C., softening point of 80–85° C. and equivalent weight unsaturation grade of about 380.

EXAMPLE 4

In a 5 l reactor provided with a thermometer, a stirrer, a distillation column and an inert gas bubbling inlet 1507 parts of 1,4-butanediol, 2098 parts of fumaric acid and 2.7 parts of monobutylstannoic acid were loaded. Therefore the mass was heated at 120° C. in order to obtain an unsaturated polyester having NA=108 and cone-plate viscosity of 160 mPas/200° C. and after cooling at 170° C., 1.4 parts of hydroquinone and 388 parts of glycidylmethacrylate were added. After 10 minutes the product was examined and it was found to have NA=51 and cone-plate viscosity of 160–200° C. The mass was mantained at 170° C. for further 4 hours and after this time the product was unloaded and an unsaturated cristalline polymer having MP of 75–80, cone-plate viscosity of 140 mPas/200° C., NA=41 and unsaturated equivalent weight of about 90, was obtained.

EXAMPLE 5

In a 5 l reactor provided with a thermometer, a stirrer and a reflux condenser 320 parts of dimethylmaleate were loaded and the mass was heated at 150° C. Thereafter a blend consisting of 880 parts of styrene, 100 parts of methacrylic acid, 440 parts of metylmethacrylate, 300 parts of butylacrylate and 20 parts of di-ter-amyl peroxyde was added dropwise for 6 hours. After the addition was completed the product was mantained at 170° C. for 1 hour and then brought under vacuum until a solid residue >95%, NA=31.6, cone-plate viscosity of 21120 mPas/200° C. and Tg=55° C., were obtained. Then 4 parts of triphenylphosphite, 10 parts of hydroquinone and 1 part of phenotiazine were loaded. After homogenization 180 parts of glycidilmethacrylate were added for 10 minutes. The product was maintained at 170° C. and after 1 hour it was found to have NA=7 and cone-plate viscosity of 7040 mPas/200° C. After further 2 hours at 170° C. the product was unloaded and cooled. It was found to have NA=2, cone-plate viscosity of 800 mPas/200° C., Tg=44° C.

APPLICATION TESTS

1. UV Hardening

The resins produced in the above examples were used according to the following composition for powder paint by using UV-rays hardening:

Resin: 92%

Flow promoter* 5%

UV photoinitiator 3%

* Master Additol XL 496 (hydroxy EW 85%+polyacrylate 15%)

The paint composition comprising the resin of the example 2 contains LH 746 (polyurethaneacrylate provided by Hoechst) as co-crosslinking agent with a resin/co-crosslinking agent ratio corresponding to 70/30.

A twin screw extruder was used for these application tests under the following conditions:

| Temperature zone (° C.): | 80-100-100 |
|---|---|
| Feed (%): | 20 |
| Rotation speed (rpm): | 300 |

The obtained paints were applied by using a corona gun and the film was hardened on a dinamic UV-IR oven provided with ten IR 230V/800W lamps and two 80 W/cm UV lamps.

For the acceptance tests Al metal sheets and MDF wooden panels were used. Acceptance test results:

| Properties | Example 1 | Example 2 | Example 3 | Example 4 | Example 5 |
|---|---|---|---|---|---|
| acetone resistence | 3 | 2 | 1 | 3 | 5 |
| 24h stability at 35° C. | 2–3 | 2–3 | 5 | 1–2 | 5 |
| impact test on MDF panel Joule | 14 | <6 | 10 | <6 | <6 |

5: negative 4: insufficient 3: sufficient 2: moderate 1: good

2. IR Hardening

By using Perkadox SB as thermic initiator, the resin of the example 5 showed a gelation time corresponding to 58 s at 180° C. The same initiator was used to examine the resin of the Example 3 with the following composition:

| Resin: | 92% |
|---|---|
| Flow promoter | 5% |
| IR catalyst | 3% |

The extrusion conditions were the same as the above stated ones. The crosslinking conditions corrisponded to a single passage through the IR lamps area at 0.5 m/min. Acetone resistence resulted moderate.

What is claimed is:

1. A process for making solid resins which comprises reacting:
   a. saturated and/or unsaturated polymers or polycondensates having a glass transition temperature (Tg) of ≧30° C. or a melting point of ≧80° C., comprising one or more reactive functional groups per molecule, said polymers being solid at room temperature; and
   b. unsaturated monomers comprising a functional group which is able to react with functional groups of said polymers or polycondensates, at a temperature above 150° C. without solvents, said reaction being conducted in the presence of polymerization inhibitors which maintain unsaturations, and under heat exchange, said reaction forming said resins in a solid form, and said solid resins having a glass transition temperature (Tg) of ≧30° C. or a melting point of ≧80° C. and comprising (meth) acrylic unsaturations.

2. Process according to claim 1 wherein the polymers and the polycondensates are selected from the group consisting of acrylic resins, saturated polyesters, unsaturated polyesters, vinyl resins and epoxy resins.

3. Process according to claims 1 or 2 wherein the polymers and the polycondensates comprise reactive groups selected from the group consisting of hydroxy, carboxylic, anhydride, glycidyl and isocyanate groups.

4. Process according to claim 1 wherein the unsaturated monomers are (meth)acrylates comprising functional groups selected from the group consisting of hydroxy, carboxylic, anhydride, glycidyl and isocyanate groups as functional groups.

5. Process according to claims 1 or 4 characterized in that the unsaturated monomers are selected from the group consisting of glycidyl (meth)acrylate, (meth)acrylic acid, methacrylisoocyanate, benzo-1-(1-isocyanate-1-methyl)-4,1-methenyl, isocyanateethylmethacrylate or unsaturated isocyanate adducts.

\* \* \* \* \*